Jan. 29, 1957 J. P. LORIMER ET AL 2,779,368
BELLY SIZING MACHINE
Filed March 27, 1952 7 Sheets-Sheet 2

Inventors,
James P. Lorimer
and Lee E. Steffenhagen,
By: Schneider & Dressler, Attys.

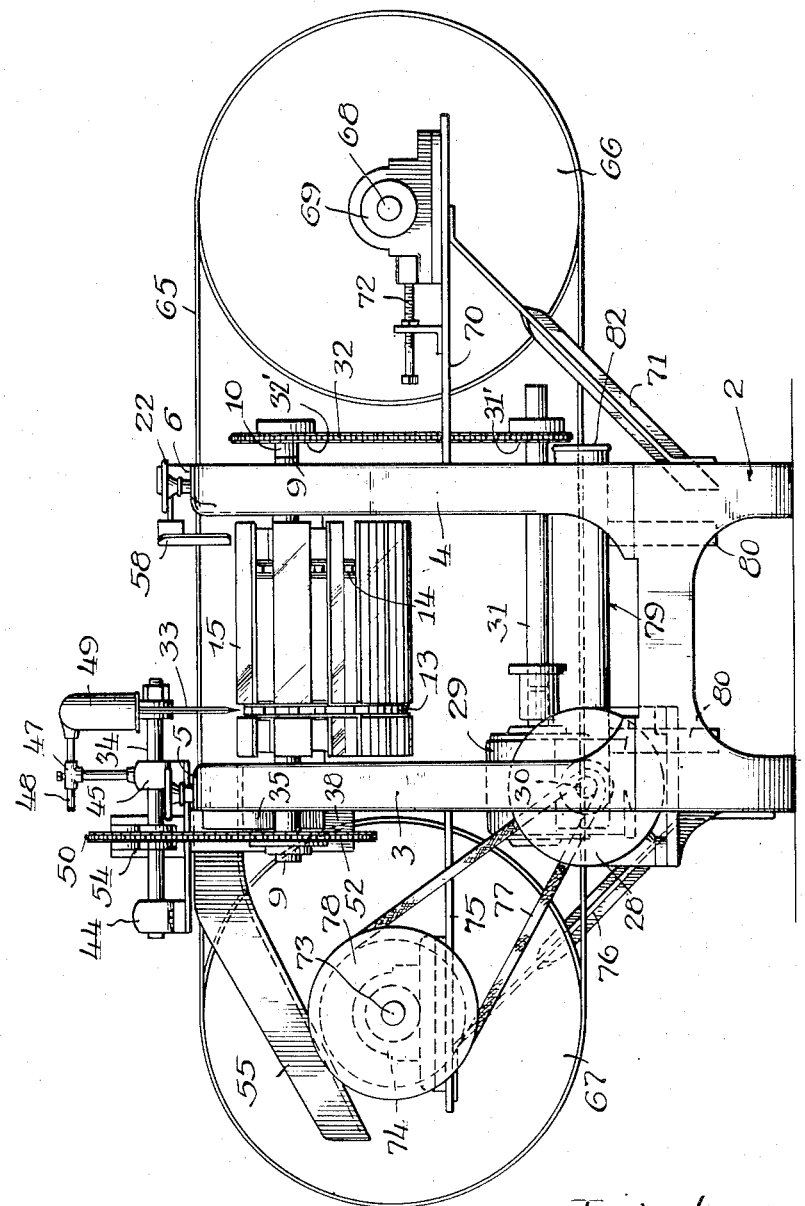

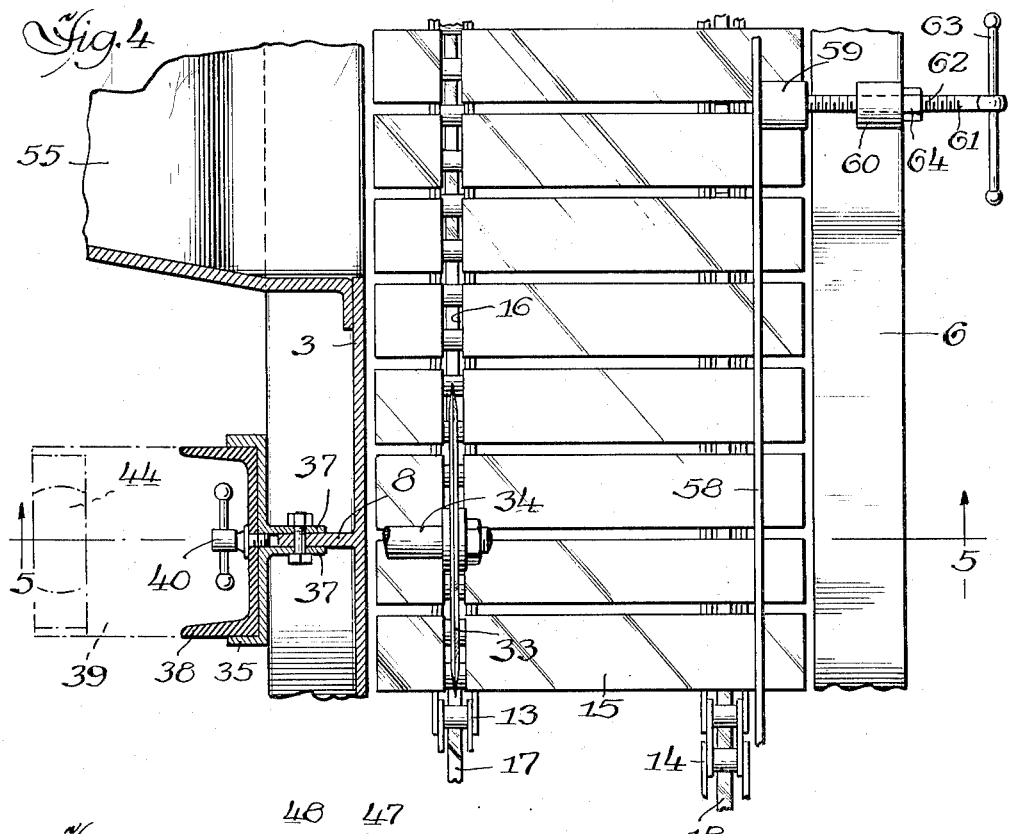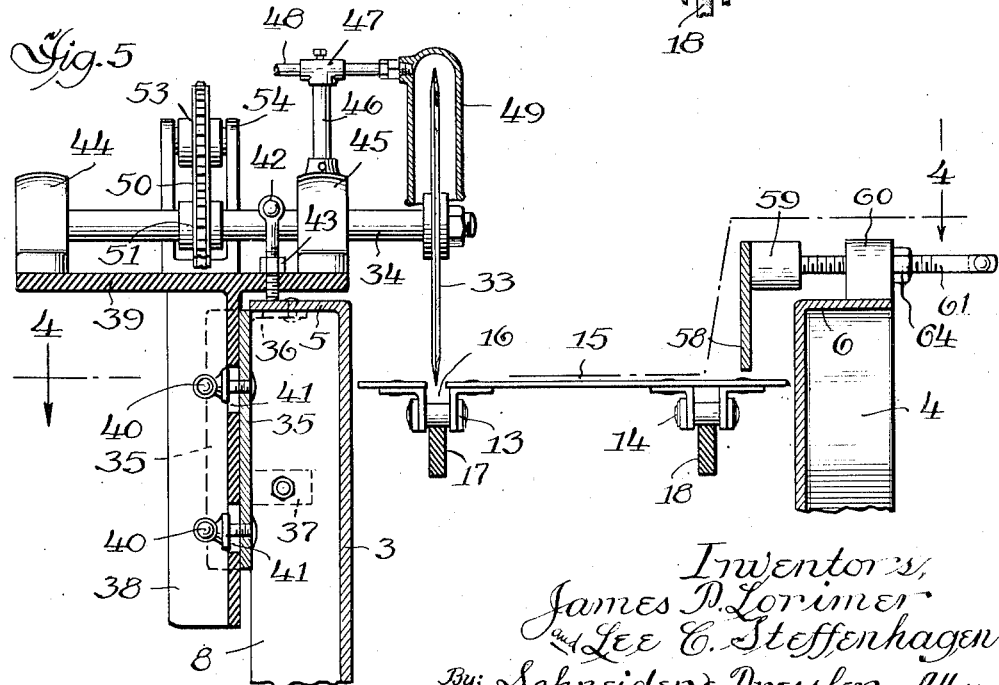

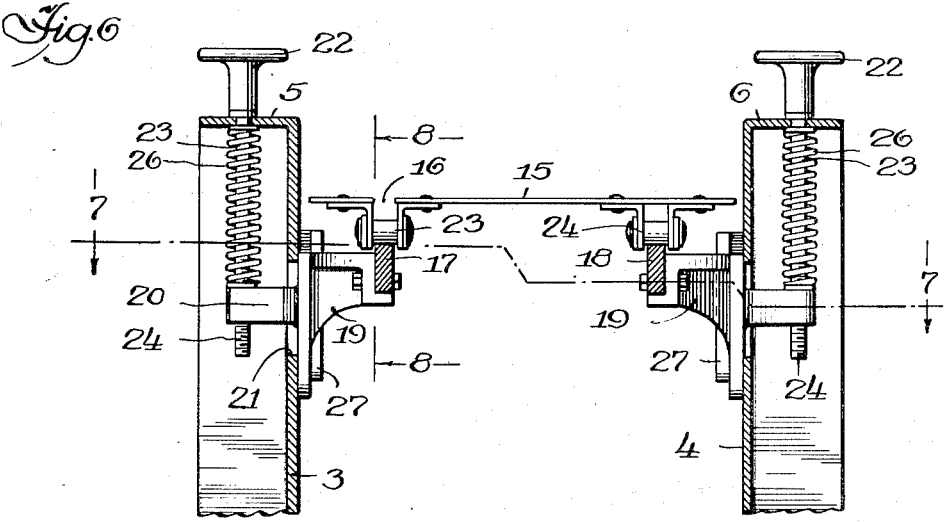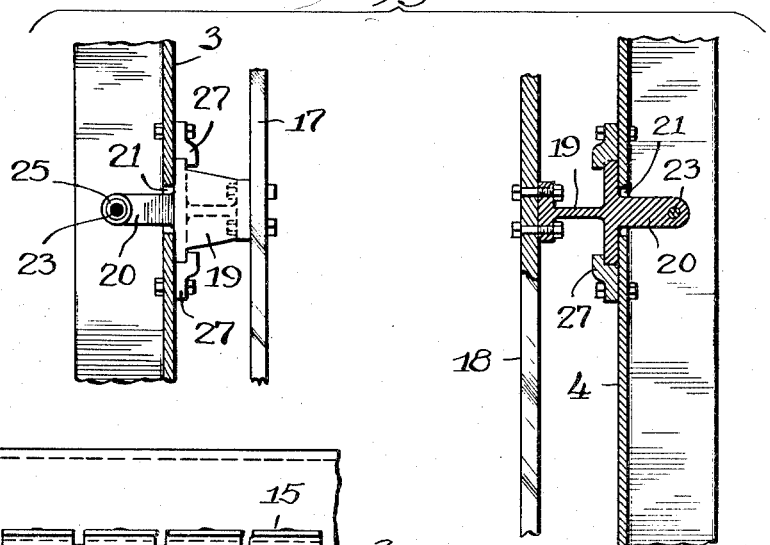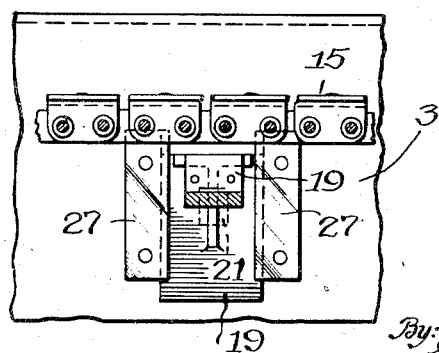

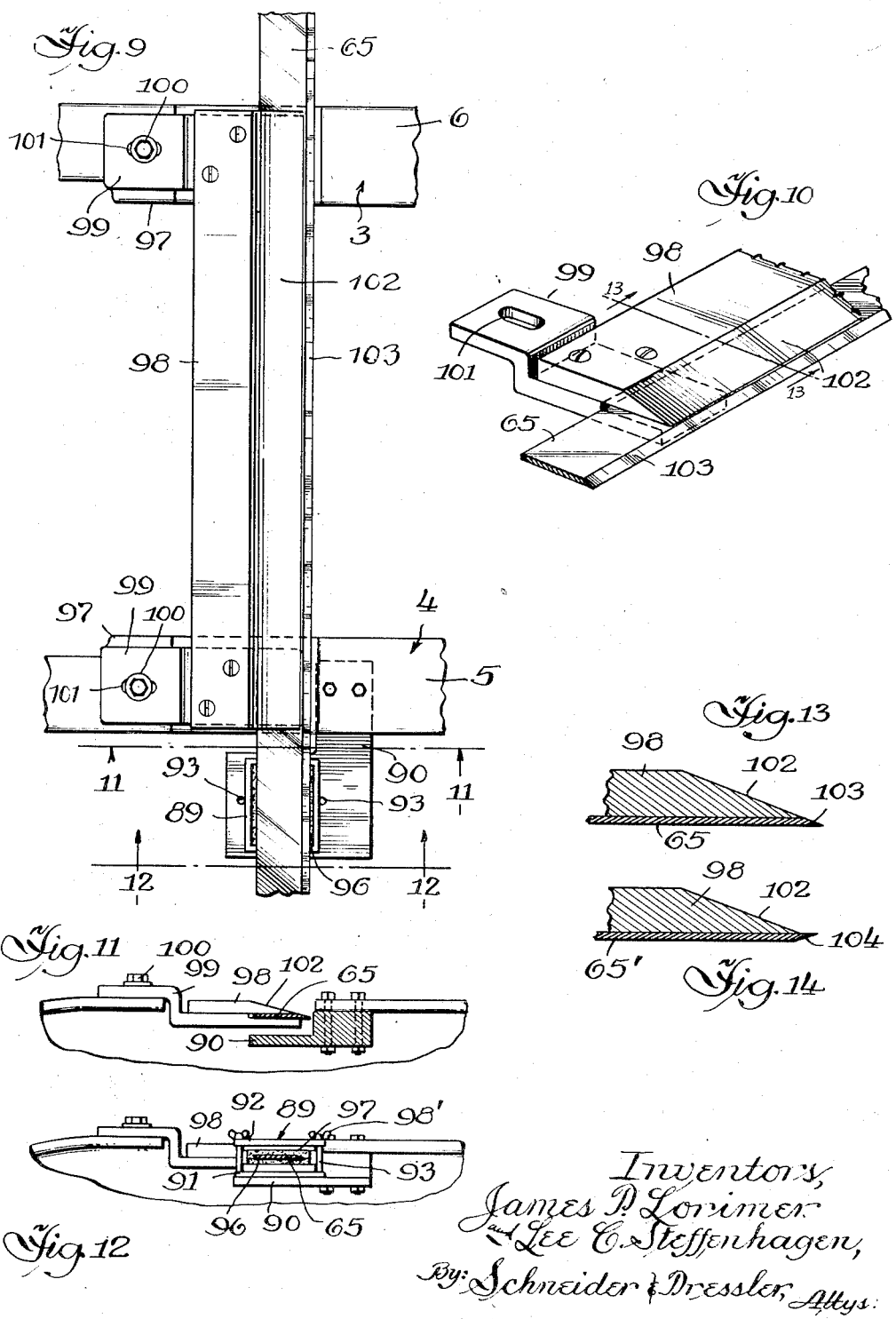

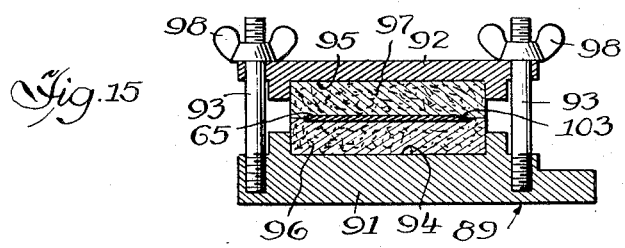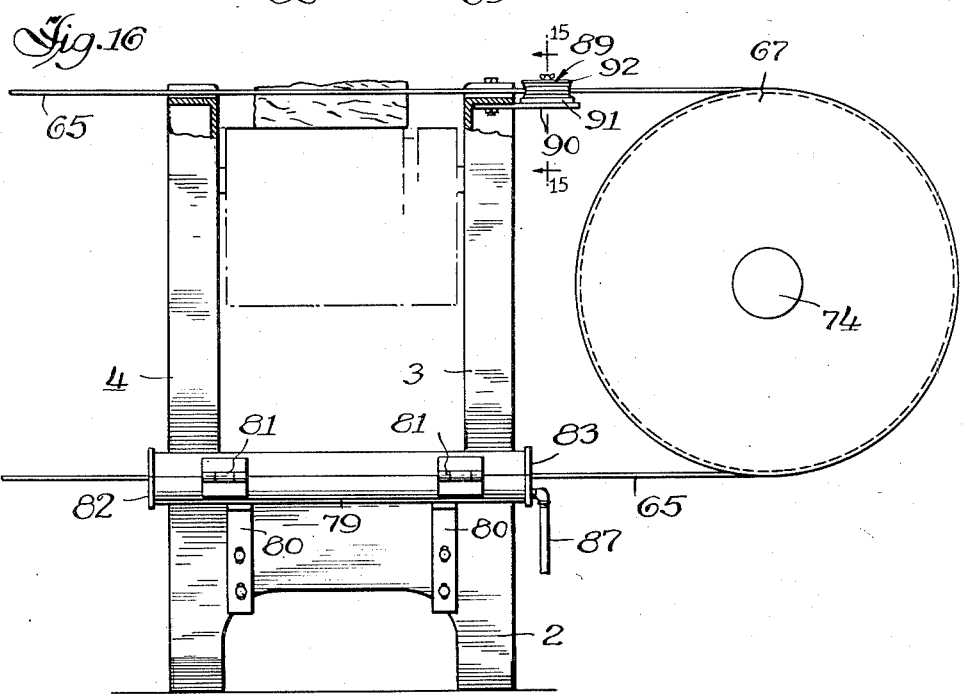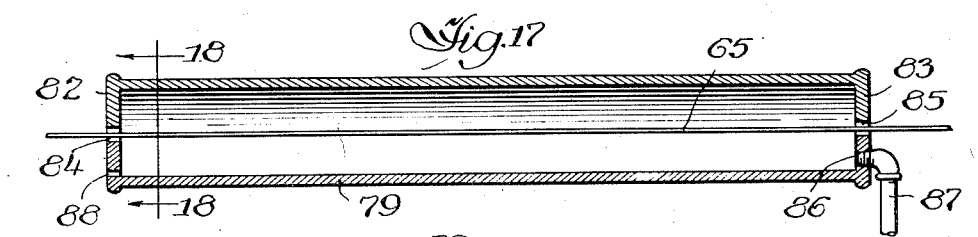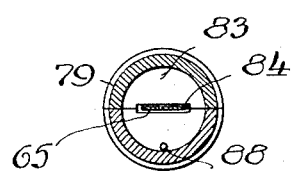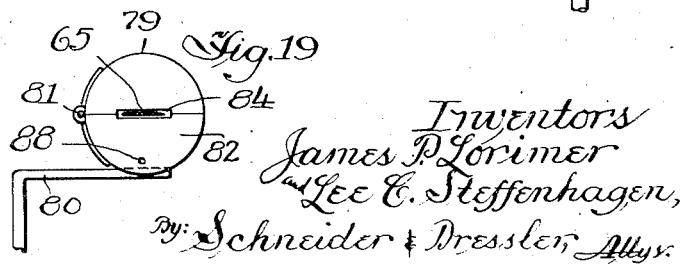

United States Patent Office 2,779,368
Patented Jan. 29, 1957

2,779,368

BELLY SIZING MACHINE

James P. Lorimer and Lee C. Steffenhagen, Cedar Rapids, Iowa, assignors to Wilson & Co., Inc., a corporation of Delaware Application March 27, 1952, Serial No. 278,804

3 Claims. (Cl. 146—78)

This invention relates to a belly sizing machine for trimming pork bellies to uniform size.

Pork bellies used in the preparation of bacon vary greatly in width, thickness, length and weight, depending upon the size and weight of the hogs from which they are taken. In ordinary practice, packing houses set up standards for the various brands or grades of bacon sold by them. However, these standards permit variation within the different grades or classifications, and in commercial production it is highly desirable to keep the sizes of the bellies of the same grade or classification within a predetermined width and thickness. This is particularly important if the bellies are to be used for the preparation of sliced bacon, since it is desirable for sliced bacon to be substantially uniform as to length and width of slices both to facilitate the packaging of the bacon and to secure a package of pleasing appearance. By the use of the machine of the present invention it has been found possible to effectively trim pork bellies to secure slabs of uniform size, thereby yielding bacon which will give highly uniform slices for packaging and sale.

In accordance with the present invention the pork bellies are trimmed to uniform width and thickness with a single handling. The machine comprises a conveyor, a rotary cutting knife operating in a vertical plane and another cutting member operating in a horizontal plane, gage means for holding the bellies in proper position, and means for operating the conveyor and both cutting members. Various adjustment means are also provided to compensate for wear of the cutting knife and to regulate the thickness to which the bellies are cut.

The structure by which the above mentioned and other advantages of the present invention are attained is described in the following specification, taken in conjunction with the accompanying drawings showing a preferred illustrative embodiment, in which:

Fig. 3 is a front end elevational view of the machine;

Fig. 4 is an enlarged fragmentary view, partly in elevation and partly in section, showing the means for adjusting the vertical position of the rotary side trimming knife to compensate for wear;

Fig. 5 is a fragmentary sectional view, taken generally along line 5—5 of Fig. 4;

Fig. 6 is a fragmentary sectional view, taken along the line 6—6 of Fig. 5;

Fig. 7 is a fragmentary sectional view, taken along the line 7—7 of Fig. 6;

Fig. 8 is a fragmentary sectional view, taken along the line 8—8 of Fig. 6;

Fig. 9 is a fragmentary plan view showing the knife guiding means;

Fig. 10 is a broken perspective view, partly in section, showing a portion of the band knife, the knife guiding means and one of the supports therefor;

Fig. 11 is a fragmentary sectional view, taken along the line 11—11 of Fig. 9;

Fig. 12 is a fragmentary sectional view, taken along the line 12—12 of Fig. 9;

Fig. 13 is an enlarged fragmentary sectional view showing one arrangement of the band knife and guide taken along the line 13—13 of Fig 10;

Fig. 14 is a view similar to Fig. 13, showing another arrangement of the band knife and guide;

Fig. 15 is an enlarged sectional view of the means for wiping the band knife prior to engaging the meat being trimmed taken along the line 15—15 of Fig. 16;

Fig. 16 is a fragmentary end view, partly in elevation and partly in section, showing the band knife and one supporting wheel therefor in relation to the frame of the machine;

Fig. 17 is a longitudinal sectional view of the steam chest for warming the band knife;

Fig. 18 is a cross sectional view, taken along the line 18—18 of Fig. 17; and

Fig. 19 is a view, partly in section, showing the steam chest in end elevation.

Figure 1:
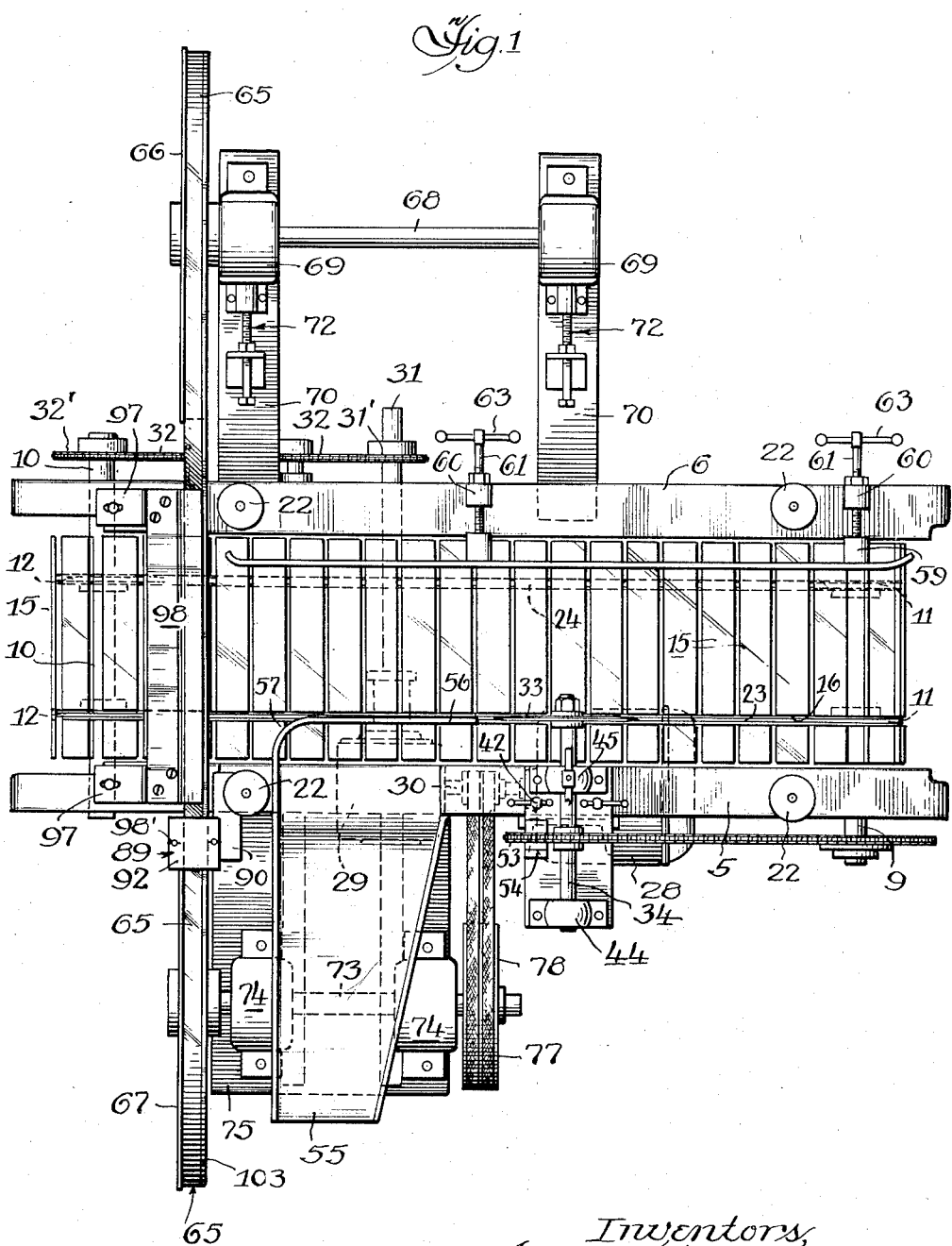
Fig. 1 is a top or plan view of a machine embodying the invention.

In the drawings, numeral 2 indicates a base upon which side frame members 3 and 4 are rigidly mounted. The upper edge of side frame member 3 extends outwardly to form a horizontal flange 5 and side member 4 has a similar flange 6 extending outwardly from its upper edge. A flange 7, parallel to flange 5, extends outwardly from the intermediate portion of side frame member 3, and a vertical flange 8 extends between flanges 5 and 7 at approximately the mid-section of the machine. The flanges 5 to 8 serve to support various parts of the machine as hereinafter described.

A pair of shafts 9 and 10 are rotatably mounted on side members 3 and 4 adjacent opposite ends of the machine. Sprockets 11 and 12, mounted on shafts 9 and 10 respectively, carry a parallel pair of endless chains 13 and 14 to which are secured a plurality of closely spaced transverse slats 15 forming an endless conveyor for the meat to be trimmed. The slats 15 may be of any suitable material, but are preferably stainless steel for sanitary reasons. The slats are each cut away to form a groove 16 (Figs. 4 and 5) extending longitudinally of the conveyor immediately above the chain 13.

The upper reaches of the conveyor chains 13 and 14 are supported on longitudinal bars 17 and 18 respectively. The bars 17 and 18 are vertically adjustable to regulate the height of the upper flight of the conveyor belt in accordance with the thickness to which the meat is to be trimmed. Thus, the bar 17 is bolted adjacent each end to a bracket 19 (Fig. 6) having a lug 20 projecting through an opening 21 in side frame member 3. A hand wheel 22 positioned above flange 5 in vertical alignment with each bracket 19 has a stem 23 extending through an aperture in flange 5. The lower end portion of stem 23 is threaded, as indicated at 24, to engage a threaded opening 25 in lug 20 to secure the bracket in vertically adjustable relationship to the side frame member. Bar 18 is similarly mounted with relation to flange 6. A coiled compression spring 26 encircling stem 23 bears against flange 5 or 6, as the case may be, and against lug 20 to hold the bracket 19 at the desired height. The threaded engagement of stem 23 with the bracket prevents accidental displacement of the bracket relative to the stem 23, but the stem might be accidentally moved upwardly if such displacement were not prevented by the spring. The hand wheel 22 has a shoulder adjacent the upper end of stem 23 which abuts the flange 5 or 6 and thereby prevents accidental downward displacement of the bracket 19. The brackets 19 are held against side frame members 3 by means of pairs of spaced guide flanges 27 bolted on opposite sides of openings 21. The inner edges of flanges 27 extend over the outer vertical edges of brackets 19 to permit the bracket to move vertically in response to rotation of hand wheels 22.

Figure 2:
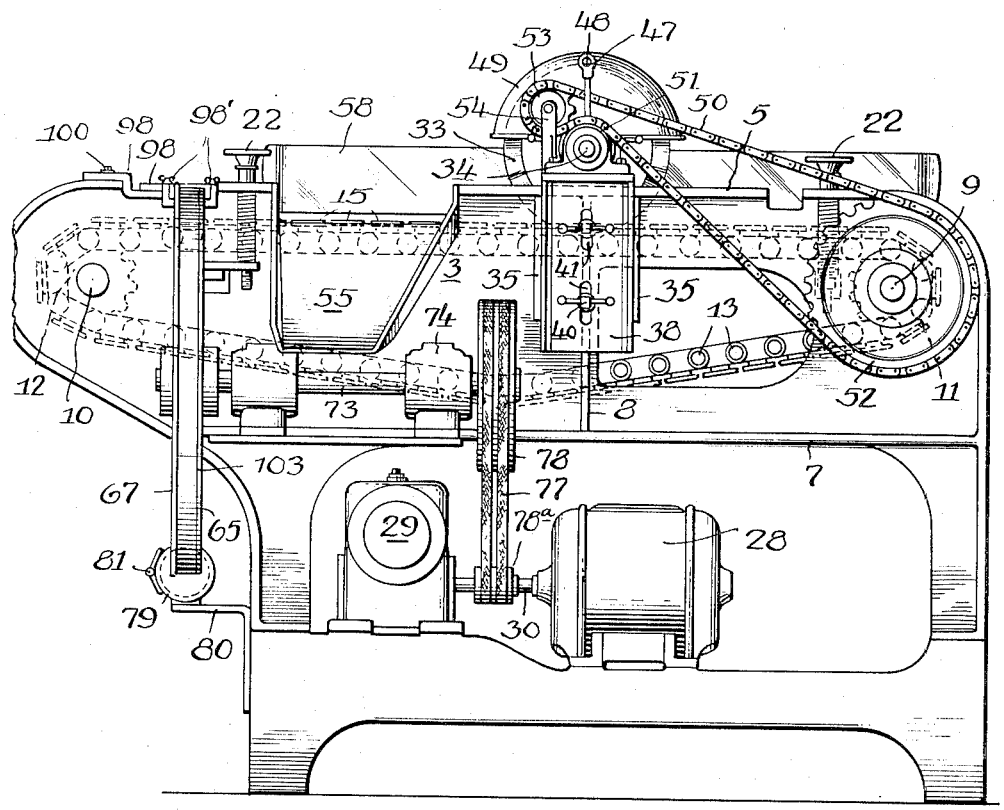
Fig. 2 is a side elevational view of the machine.

The conveyor, comprising chains 13 and 14 and slats 15, is driven by an electric motor 28 mounted on base 2. A speed reducer 29, also mounted on base 2, is connected to motor 28 by a shaft 30 (Fig. 2). A shaft 31 (Fig. 3), driven by the speed reducer 29, carries a sprocket 31' over which a chain 32 runs. The chain 32 also extends around a sprocket 32' on shaft 10, and thereby drives shaft 10 on which sprockets 12 are mounted. The teeth of sprockets 12 mesh with the chains 13 and 14 to drive the conveyor.

Side trimming of the bellies is effected by a rotary knife 33, mounted on a shaft 34 to rotate in a vertical plane with its cutting edge positioned within the groove 16. The means for supporting the shaft 34 is shown in Figs. 4 and 5. A channel member 35 extending vertically along the outer side of side frame member 3 has an upper, inwardly extending flange 36 rigidly secured to flange 5. Channel 35 is also provided with a pair of inwardly extending flanges 37 fitting on opposite sides of flange 8 and rigidly secured thereto. A supporting member comprising a channel-shaped portion 38 and a horizontal plate 39 has its channel portion fitted within the channel 35 and secured thereto in vertically adjustable relationship by means of a pair of bolts 40, which project through slots 41 in the web of channel portion 38 and are threaded into apertures in channel 35. A set screw 42 threaded through an aperture in plate 39 engages flange 5 so as to move the supporting member vertically in either direction to the extent permitted by slots 41. A lock nut 43 holds the supporting member against accidental displacement. The limited amount of vertical adjustment is desirable in order to compensate for decreasing diameter of the cutting knife 33 as its edge is gradually worn down by repeated sharpening. The shaft 34 is mounted in spaced bearings 44 and 45, which are supported on horizontal plate 39.

The pork bellies, for the trimming of which the device of the present invention is particularly intended, are composed in large part of soft, fatty tissues. Such tissues give rise to great difficulty in cutting operations, particularly where continuous operation is desired, since the fatty tissues tend to tear, accumulate on and foul the cutting blade. To avoid such fouling, it has been found highly important to maintain the cutting blade in heated condition. For this purpose means are provided for heating the rotary knife 33. The bearing 45 supports a vertical rod 46 having a horizontally disposed sleeve 47 secured to its upper end. A steam pipe 48 extends through sleeve 47 and is supported thereby. The steam pipe leads into a steam hood 49 and supports the hood in position over the upper portion of rotary knife 33. The steam fed through pipe 48 warms the portion of the rotary knife within the steam hood sufficiently so that it is still warm when it engages the meat positioned on slats 15 and being carried past the knife. Such heating of the knife has been found to be highly effective in cutting the bellies to be sized, which contain a large proportion of fatty tissues, and in maintaining continuous operation. The groove 16 in conveyor 15 insures that the cutting edge of the knife passes entirely through the slab of meat so as to trim one side of it. It will be obvious that a knife similar to knife 33 may be mounted adjacent the opposite edge of the machine if it is desired to trim both edges of the meat.

The knife 33 is rotated at high speed by means of an endless chain 50, which meshes with a sprocket 51 mounted on shaft 34. Chain 50 is driven by a sprocket 52 mounted on shaft 9, which, in turn, is rotated by chains 13 and 14. After chain 50 passes over sprocket 51 it extends around idler sprocket 53 which keeps it taut. Idler sprocket 53 is supported by a bracket 54 mounted on plate 39.

As the meat passes knife 33 the edge scraps that are trimmed off are carried along by the conveyor. The portion of the side frame member 3 extending above the horizontal plane of the conveyor is cut away rearwardly of the knife 33, and a transverse chute 55 is secured to the frame adjacent the cut away portion. A guide member 56 extends in alignment with knife 33 for a short distance to separate the scraps from the meat being trimmed and permits the trimmed scraps to be carried away from the knife. The guide member 56 is curved, as indicated at 57, Fig. 1, to merge with the rear edge of the chute 55. The curved portion of the guide 56 directs the trimmed scraps into the chute which extends downwardly to cause the scraps to slide down into a receptacle (not shown), which is placed under the end of the chute to catch them.

A side guide 58 is provided adjacent the side frame member 4 just above the conveyor slats 15 to align the slabs of meat before they are engaged by knife 33 and thereby to insure uniform width of the meat after it has been trimmed by the knife 33. The guide 58, which extends substantially the length of the machine, has spaced bosses 59 rigidly secured thereto and projecting outwardly therefrom. A block 60 is rigidly secured to the top flange 6 of side frame member 4 in alignment with each boss 59. Each block 60 is provided with a transverse threaded opening, and a pin 61 having one end rotatably mounted in boss 59 has an intermediate threaded portion 62 (Fig. 4) engaging the threaded opening in block 60. The pins 61 support guide 58 with its lower edge spaced slightly above slats 15. A handle 63 is provided on each pin 61 so that it may be rotated to adjust the lateral position of guide 58 in either direction. A nut 64, mounted on the threaded portion 62 of each pin 61, is tightened against block 60 after the guide 58 has been adjusted to the desired lateral position, to prevent accidental displacement.

A horizontally disposed cutting blade is mounted adjacent the rear edge of the machine to trim the top of the meat after the side has been trimmed, to insure uniform thickness of the bellies so that the bacon produced therefrom will have uniform thickness as well as uniform width. Although the machine illustrated shows a single conveyor for both trimming operations, it may be provided with separate flight conveyors for each operation, if desired.

In the preferred embodiment illustrated, the horizontally disposed cutting blade is in the form of a band knife 65 (Fig. 3) mounted on pulleys 66 and 67, which are positioned on opposite sides of the machine. Pulley 66 is mounted on a shaft 68 rotatably mounted in spaced bearings 69. Each bearing 69 is slidably mounted on an arm 70 extending laterally from side frame member 4. The arms 70 are rigidly secured to the frame member and are additionally supported by angular braces 71 rigidly secured to base member 2 and to the underside of each arm 70. A screw threaded take-up mechanism 72 is mounted on each arm 70 and is operatively engaged with each bearing 69 to move the bearings transversely relative to the machine and to hold them in adjusted position. The pulley 67 is similarly mounted on a shaft 73 journalled in bearings 74 supported by spaced arms 75. Each arm 75 has an angular supporting brace 76, secured to base member 2. Shaft 73 is driven by a belt 77 which extends around pulley 78 on shaft 73 and a pulley 78a rigidly mounted on shaft 30.

Means are provided for effectively heating the band knife 65 to maintain its efficiency in cutting meat containing fatty tissues. A steam chest 79 is mounted in the line of movement of the lower reach of the band knife 65, the steam chest being secured to a pair of brackets 80 secured to base member 2. The steam chest comprises two semi-cylindrical members hinged together, as indicated at 81 (Figs. 2 and 16), and has end members 82 and 83. Recesses in the end members cooperate to form openings 84 and 85 to receive band knife 65, which passes through the steam chest. One end member 83 is provided with an opening 86 to which a steam pipe 87 is connected. The openings 84 and 85 constitute a sufficient outlet for the steam, but another opening 88 is provided adjacent the bottom of end member 82 to provide an outlet for any condensation from the steam. The band knife is heated sufficiently by its passage through the steam that it is still warm when it engages the meat and fatty tissues to be cut. As in the case of the side trimming knife, such heating has been found to be important in securing effective and continued operation.

A wiper 89 is mounted on a plate 90 secured to the underside of top flange 5 of side frame member 3. The wiper comprises a bottom plate 91, which is secured to plate 90 in any suitable manner, and a top plate 92 secured to plate 91 by means of a plurality of bolts 93. The top surface of bottom plate 91 and the lower surface of top plate 92 are each recessed, as indicated at 94 and 95 (Fig. 15) respectively, and felt pads 96 and 97 are secured in recesses 94 and 95 respectively. The band knife 65 is arranged to pass between the felt pads 96 and 97 and is wiped thereby before the knife engages the meat. Bolts 93 are preferably provided with wing nuts 98 which are tightened against top plate member 92 to give the amount of pressure of the felt pads 96 and 97 against the knife to properly wipe the knife before it reaches the meat to be trimmed without interfering with the movement of the knife blade. The felt pads 96 and 97 may be taken out to be cleaned whenever necessary, or may be replaced by other pads. (In Fig. 9, as the parts are shown, the upper part 92 of the wiper is not in place.)

The band knife engages the meat as its upper reach traverses the space between side frame members 3 and 4. The knife is guided and supported through this portion of its travel by means of a plate 98 carried by spaced brackets 99 slidably secured to frame members 3 and 4 by means of nuts 100 passing through slots 101 in brackets 99 and threaded into an aperture provided therefor in the side frame members. As shown in Figs. 10 and 11, the forward edge of each bracket 99 is recessed to form a seat for the knife band, and the forward edge of plate 98 is beveled, as indicated at 102, to properly support the knife blade as it trims the top of the meat. In the embodiment of the knife blade shown in Fig. 13 the forward edge of the knife is beveled, as indicated at 103, to conform to the bevel 102. In the embodiment of Fig. 14 the forward edge of knife blade 65' is beveled in the opposite direction from bevel 102, as indicated at 104.

In the operation of the machine the operator places a pork belly on the conveyor and holds it down against the slats 15 while pressing it against the side guide 58 as it is carried past rotary knife 33. The operator may also hold the belly down as it passes the horizontally disposed cutting blade 65. The speed of the knives is of course regulated by the ratio of the various pulleys or sprockets by which they are driven. Generally no adjustment of the machine is required, after the vertical adjustments are made, except for the slight vertical adjustment of the rotary knife 33 as its diameter is reduced by sharpening, unless the size of the bellies varies.

While we have described a preferred embodiment of the invention in considerable detail, it will be understood that the description is intended to be illustrative, rather than restrictive, as many details may be modified or changed without departing from the scope of the appended claims. Accordingly, we do not desire to be restricted to the exact structure described.

We claim:

1. In a machine for trimming slabs of meat along one side and the top of said slabs of meat in two successive steps in a single handling of said meat, a frame, a vertically disposed rotary knife mounted on said frame adjacent one longitudinal edge thereof, said knife being rotatable on an axis extending transversely of said frame, a pair of transversely aligned pulleys mounted on said frame to rotate in a vertical plane extending transversely of said frame, a band knife mounted on said pulleys, a conveyor mounted on said frame, said conveyor extending past said rotary knife and past the vertical plane of said band knife, the upper reach of said band knife being positioned a predetermined distance above said conveyor, means for supporting the portion of the upper reach of said band knife above the conveyor, wiper means for wiping both surfaces of said band knife adjacent said supporting means and before reaching cutting position, and interconnected means for driving said conveyor, rotary knife, and band knife.

2. In a machine for trimming slabs of meat along one side and the top of said slabs of meat in two successive steps in a single handling of said meat, a frame, a vertically disposed rotary knife mounted on said frame adjacent one longitudinal edge thereof, a horizontally disposed cutting blade mounted on said frame in longitudinally spaced relationship to said rotary knife, conveyor means mounted on said frame, said conveyor means being adapted to carry slabs of meat into engagement with and past said rotary knife and said horizontally disposed cutting blade, interconnected means for driving said conveyor, rotary knife, and horizontally disposed cutting blade, longitudinally extending guide means mounted on said frame above said conveyor adjacent the edge opposite said rotary knife, and means for adjusting said guide means laterally relative to said frame to thereby control the width to which the meat slabs are trimmed.

3. In a machine for trimming slabs of meat to uniform width and thickness, a frame, a conveyor mounted on said frame to support a slab of meat, guide means against which said slab of meat may be held extending longitudinally of said machine, means for driving said conveyor to move a slab of meat longitudinally of said machine, a rotary knife mounted to engage one side of said slab of meat as said conveyor moves said slab of meat past said knife, a horizontally disposed cutting blade extending transversely across said conveyor a predetermined distance above the conveyor, said horizontally disposed cutting blade engaging the upper portion of said slab of meat to trim the top thereof as said conveyor moves said slab past the horizontally disposed cutting blade, and a plate extending transversely across said conveyor immediately above said horizontally disposed cutting blade, said plate engaging the rear portion of said horizontally disposed cutting blade and supporting it in horizontal position.

References Cited in the file of this patent

UNITED STATES PATENTS

| Number | Name | Date |
|---|---|---|
| 692,824 | Burleson | Feb. 11, 1902 |
| 734,840 | Feiten | July 28, 1903 |
| 1,043,257 | Schirner | Nov. 5, 1912 |
| 1,106,035 | Forman | Aug. 4, 1914 |
| 1,280,950 | Bernheim | Oct. 8, 1918 |
| 1,485,403 | MacDonald et al. | Mar. 4, 1924 |
| 1,551,964 | Mitchell | Sept. 1, 1925 |
| 1,703,217 | Watson | Feb. 26, 1929 |
| 1,817,678 | Dunseth | Aug. 4, 1931 |
| 1,916,596 | Winfree | July 4, 1933 |
| 2,110,416 | David et al. | Mar. 8, 1938 |
| 2,498,615 | Copenhaver | Feb. 21, 1950 |
| 2,505,921 | Sporket | May 2, 1950 |